United States Patent [19]
Cole

[11] Patent Number: 4,846,645
[45] Date of Patent: Jul. 11, 1989

[54] BUBBLE FORMING AND STABILIZING DEVICE FOR USE IN CONTINUOUS EXTRUSION PROCESS FOR MAKING A BLOWN FILM

[76] Inventor: Robert J. Cole, 8031 Dixie Road South, Brampton, Ontario, L6T 3V1, Canada

[21] Appl. No.: 112,187

[22] Filed: Oct. 26, 1987

[30] Foreign Application Priority Data

Mar. 31, 1987 [CA] Canada .................... 533452

[51] Int. Cl.⁴ .................................... B29C 47/20
[52] U.S. Cl. ............................ 425/72.1; 264/503; 264/565; 264/209.2; 264/209.3; 264/237; 264/569; 425/326.1; 425/378.1; 425/382.3
[58] Field of Search ................... 264/564–569, 264/237, 348, 209.2, 209.3, 503; 425/72.1, 326.1, 403, 378.1, 382.3

[56] References Cited

U.S. PATENT DOCUMENTS

| | | |
|---|---|---|
| 3,560,600 | 11/1963 | Gliniecki . |
| 3,574,806 | 4/1971 | Potter et al. .............. 425/72.1 |
| 3,618,169 | 11/1971 | Coast ..................... 264/565 |
| 3,976,411 | 8/1976 | Rahlfs .................... 425/72.1 |
| 4,049,768 | 9/1977 | Luthra .................... 264/209.3 |
| 4,115,048 | 9/1978 | Alderfer et al. ........... 425/72.1 |
| 4,189,292 | 2/1980 | Hureau et al. . |
| 4,236,884 | 12/1980 | Schott . |
| 4,259,047 | 3/1981 | Cole . |
| 4,473,527 | 9/1984 | Fujisaki et al. ........... 425/72.1 |
| 4,488,861 | 12/1984 | Reifenhauser . |
| 4,606,879 | 8/1986 | Cerisano ................. 425/72.1 |
| 4,627,805 | 12/1986 | Schnell . |
| 4,678,417 | 7/1987 | Upmeier ................. 425/72.1 |

FOREIGN PATENT DOCUMENTS

| | | | |
|---|---|---|---|
| 46-01271 | 1/1971 | Japan ............ | 264/565 |
| 52-12268 | 1/1977 | Japan ............ | 264/565 |
| 318480 | 6/1972 | U.S.S.R. ......... | 264/565 |
| 2126160A | 3/1986 | United Kingdom . | |

OTHER PUBLICATIONS

Booklet published by Reifenhauser KG Machinenfabrik

Primary Examiner—Jeffery Thurlow
Attorney, Agent, or Firm—Armstrong, Nikaido, Marmelstein, Kubovcik & Murray

[57] ABSTRACT

This invention discloses a new bubble forming and stabilizing device for use in a continuous extrusion process for making a blown film and a process for using same. The apparatus comprises a bowl shaped mandrel mounted subsequent to a die, the mandrel has an undersurface extending substantially parallel to and space from the path of travel of the blown film from the die and the undersurface is contoured to guide a stream of cooling air along its surface between the undersurface and the blown film as the blown film emerges from the die. The apparatus allows for increased production rates and improved physical properties of the forming bubble by creating more efficient heat transfer from the forming bubble to the cooling air stream. The device also provides support for the molten bubble during its most unstable state.

15 Claims, 4 Drawing Sheets

BUBBLE FORMING AND STABILIZING DEVICE FOR USE IN CONTINUOUS EXTRUSION PROCESS FOR MAKING A BLOWN FILM

BACKGROUND OF THE INVENTION

1. Field Of The Invention

This invention relates to a new apparatus used as a bubble forming and stabilizing device in a continuous extrusion process for making a blown film and a process for using same. Blown films may be made from any one of several processes and one such process is commonly referred to as a blown continuous extrusion process. The invention discloses an internal air deflector and bubble forming and stabilizing mandrel for use in internally cooling and stabilizing a bubble of blown film during the extrusion process. The device allows for increased production rates, improved stabilization and improved physical properties of the forming bubble by effectively forming the bubble over an internal mandrel enabling a high velocity cooling air stream to be directed between the under and outer surfaces of the mandrel and the inner surface of the forming bubble usually formed of a polymer. The invention enables more efficient heat transfer from the extrusion polymer to the cooling air stream causing the molten polymer to drop in temperature more quickly in the blowing process which subsequently also improves the stability of the process and further allows even higher internal and external air velocities to be introduced which in turn allows for increased productivity and improved product quality due to improved stability. The device also provides support for the molten polymer during its most unstable state.

2. Description Of The Prior Art

The device of the present invention is particularly suitable for use in a continuous process for the production of blown film. In many cases, the blown film will be formed from a polymer resin although other materials may be used to produce a blown bubble. For ease of reference, and not for limitation purpose, the following description will be made with reference to a bubble formdd from a polymer. In a typical process, a hot polymer melt is fed to a die from which it is extruded in the form of a tube which is nipped at a desired point after cooling to form a bubble. The extruded polymer is generally expanded by using internal air pressure to blow the polymer into a bubble and the bubble should be of uniform and constant thickness subsequent to the frost line. However, the tube which emerges from the die itself is generally unstable due to low melt strength until its temperature is reduced sufficiently to improve the melt strength and eventually solidify the polymer, that is, at its frost line To increase the rate at which the molten bubble reaches the point of solidifying at the frost line, the temperature of the forming bubble is reduced as quickly as possible while still maintaining the desired stability. This may be done in several ways. One of several known methods is by using an external air ring which directs cooling air onto the outer surface of the forming bubble as it emerges from the die. Additional cooling can also be achieved by cooling the inside of the bubble such as is disclosed in U.S. Pat. No. 4,236,884 granted on Dec. 2, 1980 to Gloucester Engineering Co., Inc. The amount of cooling is generally limited by the temperature of the cooling air, the melt strength of the extrusion polymer, the blow-up ratio of the bubble size to the die size and the volume and velocity of cooling air that can be introduced to the inner and outer surfaces of the forming bubble without destroying the stability of the forming bubble. These limitations directly affect the production line speed and the product quality through the extrusion process.

Various devices have been proposed which attempt to reduce the temperature of the air within the forming bubble to improve the extrusion rate which in turn reduces production costs.

Cooling of the forming bubble can be achieved by cooling from the inside of the forming bubble or by outside cooling of the bubble, or by both. An example of the exterior cooling is shown in U.S. Pat. No. 4,259,947 granted to Robert J. Cole, the inventor herein. In this patent, there is disclosed a dual lip air ring wherein the exterior air is blown radially outwardly away from the forming bubble emerging from the die. The resulting venturi effect and low pressure zone causes the forming bubble to draw away from the medial line as it emerges from the die and allows a nonimpinging, relatively high velocity air stream to be introduced to the exterior wall of the forming bubble, cooling it faster than direct impingement cooling. By cooling the forming bubble faste while maintaining the stability of the bubble, it is possible to increase the rate of extrusion of the bubble and maintain good quality thus reducing production time and costs.

Additional cooling can also be achieved from the inside of the bubble. As shown in U.S. Pat. No. 4,236,884, there is proposed a device which exchanges the hot interior air within the forming bubble with cooler air via ports located within the die mandrel itself. Air is supplied to a series of internal nozzles which blow the air radially outwardly at the internal surface of the forming bubble.

These and other processes of the prior art have clear limitations due to the effect of the impingement of the air and the low melt strength of the polymer during the blowing process. Further, as the formin bubble itself is increased in size with relation to the die size, the radial distance between the internal air nozzles and the wall of the forming bubble will also increase which has the undesired effect of reducing the efficiency of the cooling process.

SUMMARY OF THE INVENTION

Accordingly, it is an object of the present invention to at least partially overcome these disadvantages by providing an apparatus suitable for use in a continuous blown film process which allows for more efficient cooling of the forming bubble as it emerges from the die.

It is a further object of the present invention to provide an apparatus suitable for use in a continuous blown film process which provides a method of better supporting and stabilizing the forming bubble during the blowing process while the molten polymer is in its most sensitive and unstable state.

It is yet a further object of the present invention to provide an apparatus suitable for use in a continuous blown film process which results in improved product thickness uniformity and which reduces width variations of the resultant product thereby resulting in an improved product sheet flatness.

A still further object of the present invention is to provide an apparatus for use in a continuous blown film process which results in a faster quenching of the molten polymer relative to the distance or time of the polymer from the die to the frost line, thereby resulting in improved clarity and less haze of the resultant product.

It is yet a still further object of the present invention to provide an apparatus for use in a continuous blown film process which allows for control of the stock of the bubble and the temperature of the polymer at the point of blowing thus allowing for improved control of the orientation of the forming bubble and its physical properties.

To this end, in one of its aspects, the invention provides an apparatus for use in a continuous extrusion process for making a blown film which comprises a bowl-shaped mandrel mounted subsequent to a die suitable for forming a blown film, wherein said mandrel has an undersurface extending substantially parallel to and spaced from the path of travel of the blown film from said die, said undersurface contoured to guide a stream of cooling air along its surface between said undersurface and said blown film as said blown film emerges from said die.

Other objects and advantages of the present invention will appear from the following description taken together with the companying drawings.

DESCRIPTION OF THE PREFERRED EMBODIMENT

Figure 1:
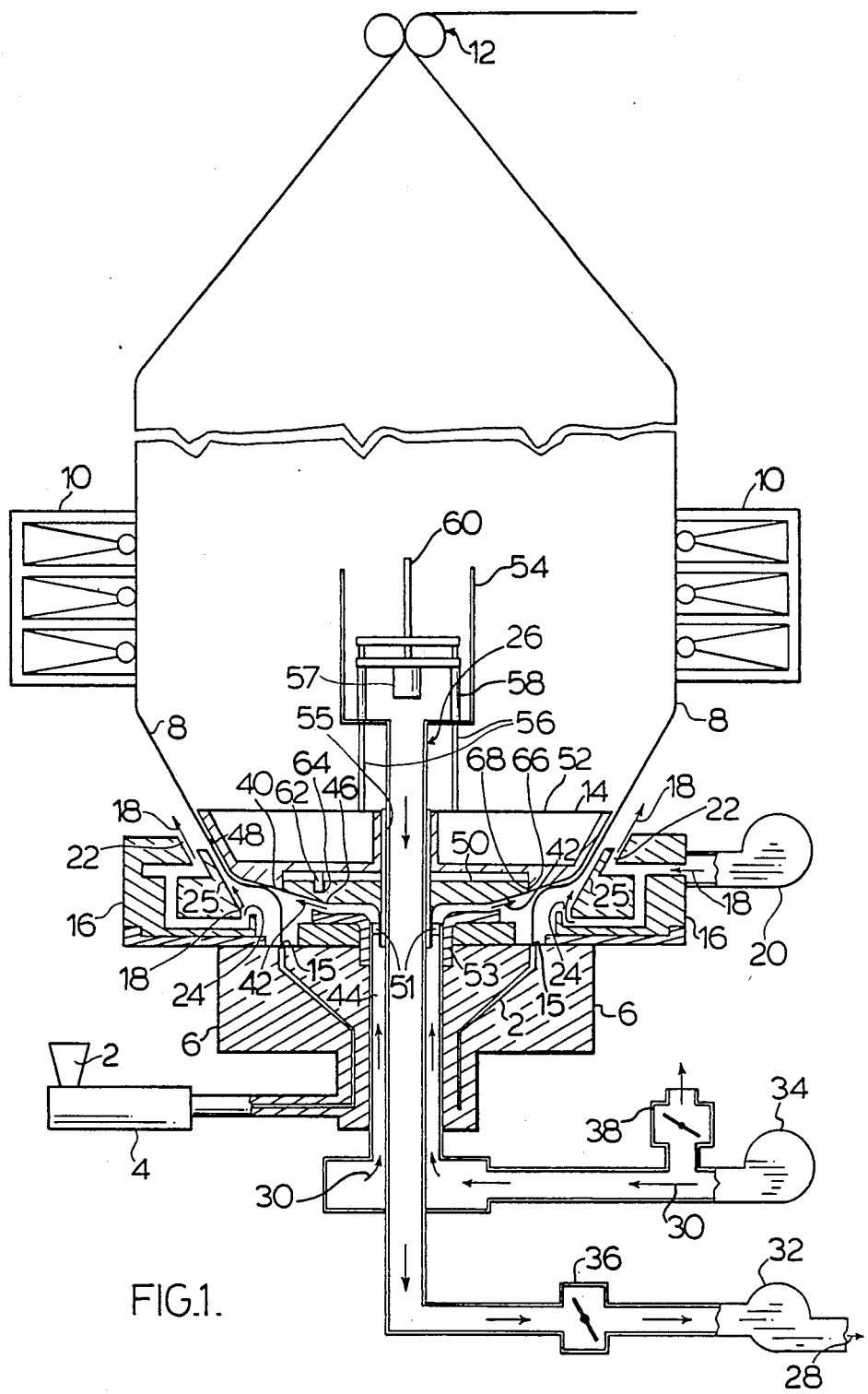
FIG. 1 is a schematic representation of an apparatus for a typical blown film process embodying the present invention.

Referring now to FIG. 1, there is shown a schematic representation of an apparatus for typical blow film process embodying the present invention. The polymer 2 is fed from a supply 4 to a die 6 wherein the polymer 2 is converted to a tubular flow surrounding a mandrel in the die 6. The polymer 2 emerges from the die 6 in a tubular form and is blown into a continuous, tubular film 8 which may or may not be stabilized by an external stabilizer calibration cage 10. Following stabilization and calibration by the stabilizer cage 10, the film 8 is nipped by nip rollers 12 and collected, at a desired stage downstream of the nip rollers. Films currently made may vary in thickness from 10 microns to up to 1.0 mm in thickness, but not limited thereto.

As the film 8 leaves the die 6 at point gap 15, the polymer is very hot and must be cooled rapidly. In most applications, the polymer must be stabilized by good aerodynamic principles until the desired stock temperature is achieved. The longer the cooling takes, the longer the polymer is in a condition wherein it is unstable thus making the extrusion process more difficult to control. Thus, it is important to quickly cool or control the molten polymer as quickly as is possible to maintain the integrity of the resulting film. For example, if an attempt is made to cool the forming bubble more quickly by increasing the velocity of the cooling air, the bubble may well become unstable and may collapse due to the pressure of the impinging air or pressure of the air relative to the weak melt strength of the forming bubble. Thus, it is important to balance rapid cooling with the integrity of the bubble during the blowing and cooling process.

In order to effect such cooling, FIG. 1 shows the use of a dual lip air ring 16. This device is fully disclosed in U.S. Pat. No. 4,259,047 issued on Mar. 31, 1981 to Robert J. Cole, the present inventor. This air ring 16 is used with a die in a blown film process to apply cooling air to the exterior surface of an extruded tube of film-forming material passing through the air ring 16. Air 18 is supplied from a supply 20 and is discharged from a first downstream gap 22 in air ring 16 radially outwardly from the path of movement of the film 8 in the unexpanded state so as to create a vacuum force which urges the tube outwardly by vacuum forces and causes cooling air to flow along the surface. A second upstream gap 24 delivers a tubular stream as a boundary layer of air that precools the film 8 and lubricates the surface of the external deflector dye or forming cone 25 and prevents the forming bubble from sticking to the structure between the upstream gap 22 and the downstream gap 24.

The present invention relates to the use of an internal supply air deflector, bubble forming and stabilizing mandrel generally indicated as 14. This device 14 is a bowl-shaped mandrel which surrounds a central air exhaust stack 26 and affixed to an elevator device 54. As will be explained hereinafter, the internal hot air is exhausted through the air exhaust stack 26 to exhaust port 28. Cool air is supplied through supply manifold 30. The supply and exhaust of air through the manifold system and bubble size sensor system (not shown) may be carefully controlled by means of blowers 32, 34 and control dampers 36, 38. The blowers 32, 34 may or may not be variable speed blowers.

Figure 2:
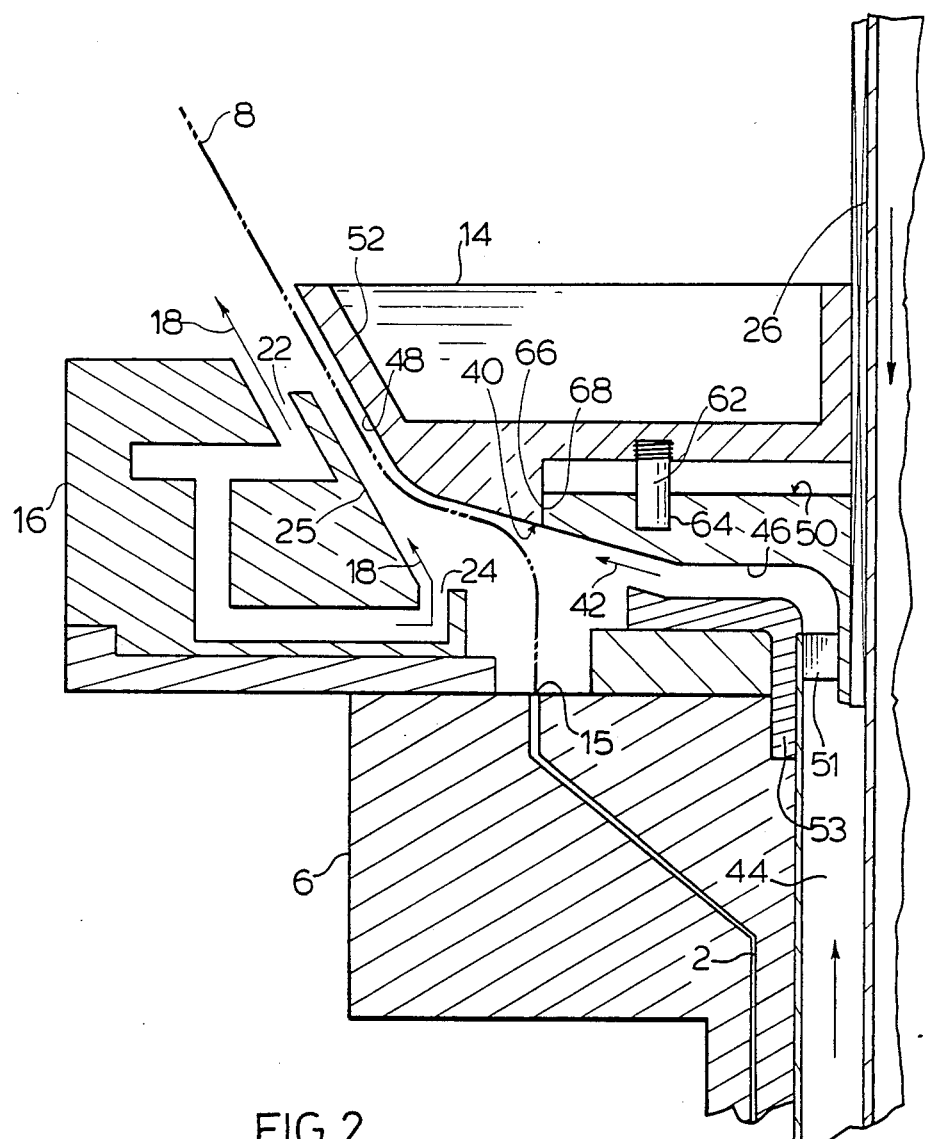
FIG. 2 is a sectional view through one-half of the internal supply air deflector and bubble forming mandrel of the present invention.

FIG. 2 is a sectional view through one half of the internal "supply air" deflector and bubble forming and stabilizing mandrel 14. The mandrel 14 has a continuous undersurface 40 along which relatively high velocity cooling air 42 is supplied and attached. The cooling air 42 is fed from the conduit 44 radially outwardly and along fixed first surface 46 to second surface 48. This cooling air 42 attaches itself to the second surface 48 and pulls the stock of the forming bubble 8 along the same path from the extrusion die 6. The forming bubble 8 attaches itself to the air stream 42 because of the vacuum effect caused by the low pressure zone of high velocity air along the second surface 48. The stream of cooling air 42 becomes itself the lubrication over the mandrel surface for the forming bubble 8 emerging from the die 6. Since there is not any impingement of the air onto the molten polymer of the forming bubble, it is possible to use even higher velocities of cooling air along the inner bubble surface which serves to cool the melt much more rapidly than any of the prior art devices. At the same time, improved stabilization of the forming bubble is achieved due to the vacuum forming effect on the melt. The transfer of heat from the melt to the cooling air is markedly improved thus increasing the efficiency of the overall system.

The bowl shaped mandrel 14 is rotatably secured to the die 6 so that if and when the die 6 rotates during the blowing process, the mandrel 14 will rotate in conjunction therewith. During the blowing process, it is sometime advantageous to rotate the die 6 to move any imperfections in thickness variation, back and forth across the winding roll. In order to maintain the desired effect without destroying the integrity of the forming bubble, the mandrel 14 rotates in concert with the die. This may be accomplished by any suitable means, such as affixing the mandrel to the die itself.

Figure 3:
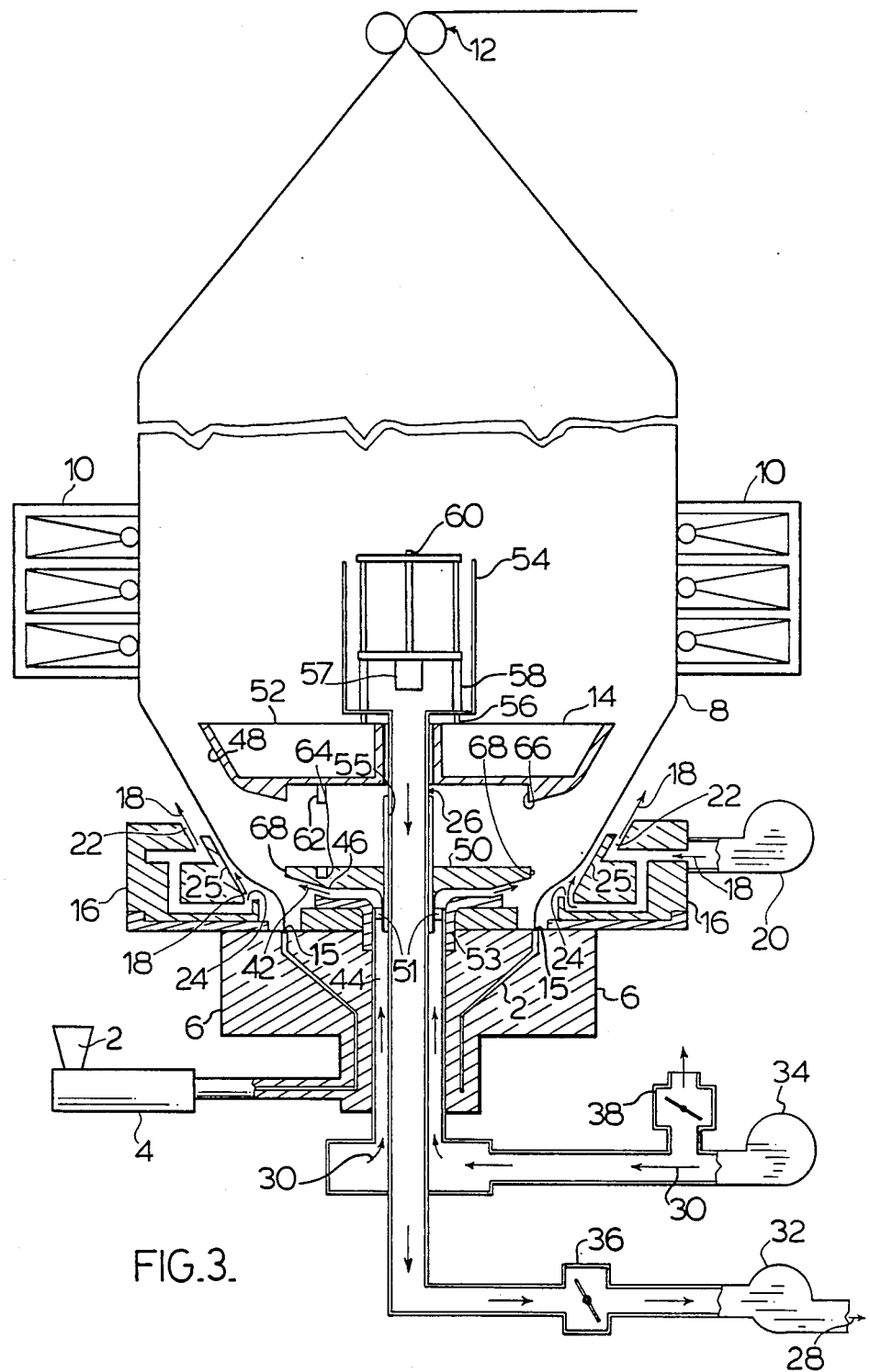
FIG. 3 is a schematic representation of an apparatus for a typical blown film process embodying the present invention wherein the movable portion of the mandrel is separated from the stationary portion to allow for start-up of the process.

The bowl shaped mandrel 14 consists of a first portion 50 fixed to the die and an axially moveable portion 52, which is moveable away from the first portion 52 as shown in FIG. 3 for the purpose of start-up and finding the optimum gap between the internal mandrel and the external air ring deflector cone. The first portion 50 is affixed to the die 6 itself and can only rotate as the die rotates as explained hereinbefore. No movement away or towards the die will occur. The axially moveable portion 52 is attached to an elevating device 54 which allows axially moveable portion 52 to be moved away from or towards the first portion 50. This may be done in any desired way. One example as shown in FIG. 3 is to attach the upper surface of the axially moveable portion 52 to a pair of piston rods 56 which in turn cooperate with pistons 58. As the thread drive rod 60 is rotated by the air motor elevating device 57, this in turn raises rods 56 which in turn raises the axially moveable portion 52 away from the first portion 50.

When the axially moveable portion 52 is lowered and meshes with first portion 50, the pin 62 fits within opening 64 to orientate the portions in the correct alignment and drive the mandrel 52. As shown in FIG. 3, the leading edge 66 of the underside cutaway portion of the axially moveable portion 52 engages outer wall 68 of first portion 50. Thus, in the contiguous position as shown in FIG. 1, axially moveable portion 52 is correctly aligned with first portion 50.

Thus, when the axially moveable portion 52 is engaged with first portion 50, the entire bowl will rotate as a unit when the die is rotated.

One example of a means to affix the mandrel 14 to the die 6 is shown in FIG. 1 and 3. In this case, first portion 50 is connected to a spoke 51. Spoke 51 is connected at its opposite end to connector 53 which is secured in the die 6. Thus, when die 6 rotates, this rotates spoke 51 which rotates portion 51 of the mandrel 14. While only one spoke 51 is shown in FIGS. 1 and 3, it is preferably to have a number of such spokes 51 to securely affix portion 50 to die 6. In order for the die 6 to rotate about the shaft 26, a sleeve bearing 55 covers shaft 26 at the place of rotation of the mandrel.

It is important that axially moveable portion 52 is able to move away from first portion 50 during the start up phase of the blown film process. It has been found that during the start up phase, a gap of about 12 inches is necessary for the operator to place his hands to pull the forming bubble up around the mandre during the initial start-up stage.

The bowl-shaped mandrel may be made of any desired size and is not limited to any particular dimensions. The mandrel may be made of any desired material in this case, made of cast aluminum. It is also possible that the bowl-shaped mandrel may be designed to create specific properties in the finished product, by altering the exact shape and size of the mandrel and elevation from the extrusion point 15.

Air 42 is of a high velocity and it is thought that it is attracted to and attaches itself to the undersurfaces 46, 48 of the mandrel itself. Based on an understanding of current aerodynamic theory it is understood that this high velocity air will not wander away from these surfaces but its path literally conforms to the contour of the mandrel but when leaving the mandrel, attaches itself to the inner surface of the forming bubble. Since the air is of high velocity, it creates a low pressure area or zone which attracts the forming bubble thereto and pulls it along as the air travels over its path.

It has been found by the present inventor that substantial improvements in the cooling processes and other benefits are achieved by using the apparatus of the present invention. For example, improvement in the cooling rates of not less than 15% over prior art processes have been noted and expected up to 50% with further refinements. It is also important that with low melt strength polymers, the gains are potentially greater since more failure of the bubble stability occurs with impinging air of the prior art. Many of the new resins used for blown films have very low melt strengths thus making it even more important to improve and maintain the integrity of the forming bubble during the cooling stage.

The velocity of the cooling air along the inner surface of the forming bubble using the apparatus of the present invention has been increased considerably over that of currently used velocities. The temperature of the cooling air has not proved critical as in the prior art but it is believed better utilization of cooler air is achieved. The significant advances in heat transfer and other notable gains are not completely understood but some are known to relate to the successful introduction of high velocity air along the inner surface of the molten bubble in its most sensitive state, as well as to a good scrubbing action achieved along this same surface breaking up the boundary layer of air, with the present apparatus.

The prior art devices generally blow cooling air radially outwardly at the inner wall of the forming bubble, and do not provide means to stabilize the forming bubble. Thus, the melt strength of the forming bubble in the molten state limits the velocity of the cooling air. Since there is also no direct impingement of cooling air on the bubble, the previous restriction based on the melt strength has been effectively removed thus allowing for higher velocities to be used resulting in more effective cooling. Since this air travels in the same direction as the direction of travel of the forming bubble, it significantly aids in more rapid cooling. It is also believed that the vacuum created by the low pressure zones contributes significantly to the stabilization of the forming bubble.

It is also significant that the cooling air 42 acts on the forming bubble 8 closer to the die 6 so that cooling is effected earlier. It is also significant to understand that since the cooling of the forming bubble 8 is achieved much faster than with prior art device, it allows, as a direct result of improved melt strength, increased air velocities to be used with such other features as the external dual lip air ring. Since initial cooling is much faster, the limitation of the melt strength of the forming bubble vis-a-vis the velocities of the air in the air ring is significantly reduced, thus allowing higher velocities to be used from the external air ring thus further increasing the rate of cooling. This synergistic effect is most notable with polymers of low melt strength. Also, due to the internal support of the mandrel backing the melt against a fixed form or surface allows for higher velocities of external air cooling without collapsing the bubble in its molten state.

In another embodiment of the present invention, when it is desired to produce a bubble having a long stock, commonly referred to as a wine glass shaped bubble or a long stock bubble, the mandrel 14 is raised to the desired distance from the die 6. In this embodiment, the molten polymer emerges from the die and rises as the stock with a small diameter until the stock of the polymer has sufficiently reduced its temperature to a desired temperature at which time, the bubble will be blown in the same manner as explained hereinbefore.

In this embodiment, the external air ring 16 has an elevator device affixed thereto and the air ring 16 would be elevated to a position immediately below the mandrel 14 allowing an appropriate gap between the undersurface 40 of the mandrel 14 and the deflector lip of the air ring 16 as disclosed hereinbefore. The relationship between the mandrel 14 and the air ring 16 in this embodiment would be indentical to that shown in FIG. 1, but elevated from the die 6.

This embodiment allows for a change in the orientation of the polymer which affects the mechanical properties of the polymer such an elongation and tear resistance in the machine direction vis-a-vis the transverse direction.

It is also possible with a further embodiment of the invention, to further improve the process by introducing and exchanging as much cooler air volume as possible as quickly as possible to reduce the internal bubble temperature for further cooling affect. In order to increase this cooling, it is preferred to exchange the total volume of air within the bubble as many times per minute as can be achieved. This can be done by creating a supply air annular flow channel surrounding the exhaust stack to channel air past the elevating bowl mandrel and introduce the air radially outwardly through one or more orifices at a point past the bowl mandrel. This may be below or past the frost line or both. In this case, the mandrel would slide up and down the outer diameter of this additional annular supply air channel on a sleeve bearing similar to the design described hereinbefore.

Figure 4:
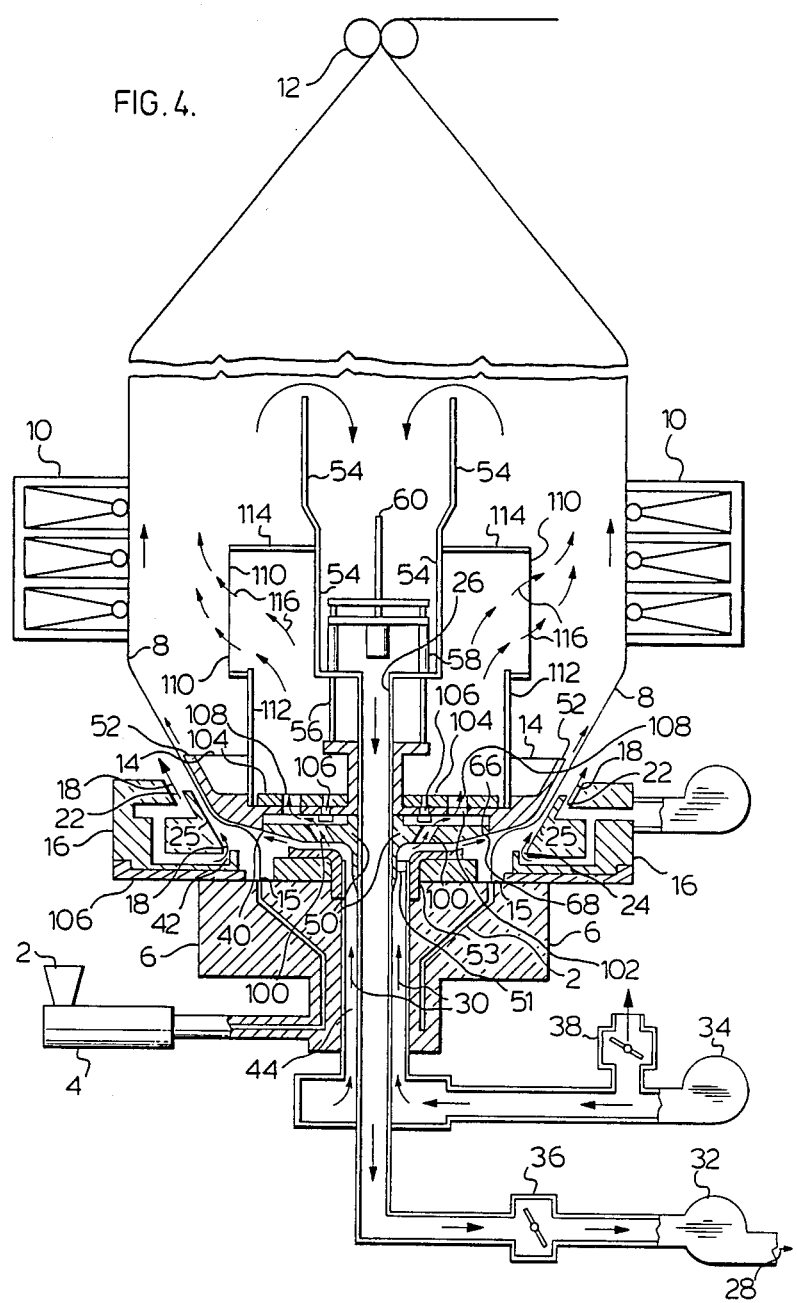
FIG. 4 is a schematic representation of an apparatus for a typical blown film process using a second embodiment of the present invention.

This embodiment is illustrated by FIG. 4 of the appended drawings. In FIG. 4, annular holes 100 are provided extending through the first portion 50 of the bowl shaped mandrel 14. Annular holes 102 are provided through axially movable portion 52. A flow control valve 104 is rotatably mounted on the top surface of the portion 52 via screw 106. Flow control valve 104 has holes 108 which correspond in number and size to holes 102 in portion 52.

A diffuser (preferably a perforated screen) 110 is mounted on brackets 112 which are fixed to portion 52. The top of the screen 110 is mounted on arms 114 of the elevating device 54.

As explained hereinbefore, cooling air is introduced along the underside of the mandrel 14 to break up the boundary air so that the cooler air will cool the bubble more effectively. This cooling air scrubs the surface of the melt to increase the overall efficiency of the process. However, the amount of air which can be introduced is limited by the melt strength of the bubble. The velocity of the air and the turbulence thus created is thus reatricted by this melt strength.

The inventor has found that if more cooling air were introduced to the inside of the bubble as the limit of the velocity of the exterior cooling air is reached, this will also increase the cooling of the bubble. In this embodiment, cool air is fed up under the mandrel 14 and then through the annular holes 100, hole 102 and holes 108. This cooling air moves upwardly and out through the diffuser 110 as shown by arrows 116. By feeding this cooling air radially outwardly at a higher level, a means has been found to provide additional cooling air to the bubble to increase the exchange of hot air thus promoting further cooling.

The flow control device 104 is rotatable preferably by a motor (not shown) to align the holes 102 with the holes 108 and to control the amount of air passing through these holes. The screw 106 is first unlocked, the valve turned as desired and then the screw is locked in place. Preferably, the flow control valve is an aluminum plate. The diffuser 110 may be of any suitable material and is preferably a steel screen having an open area of about 40%.

By using this embodiment, the total volume of air within the bubble may be exchanged more generally and thus, cools the bubble even further, without destroying the integrity of the bubble.

The present invention has been described and illustrated with respect to a vertically aligned apparatus and process wherein the bubble is formed in a vertical direction. This has been done for illustrative purposes only and it is equally applicable to a line in any other orientation.

While the present invention has been explained with reference to a bubble formed from a polymer resin, it is to be understood that it is equally applicable to forming bubbles of other materials, such as various types of rubbers, the invention is applicable for use in any continuous blown film material.

While the invention discloses and describes a preferred embodiment of the invention, it is understood the invention is not so restricted.

The embodiments of the invention in which an exlcusive property or privilege is claimed are defined as follows:

1. An apparatus for use in a continuous extrusion process for making a blown film , comprising:
   a bowl-shaped mandrel mounted subsequent to and rotatably in concert with a die suitable for forming a blown film, said mandrel including a first portion fixed to said die and an axially movable portion seating with said first portion and adapted to be moved away from or towards said first portion,
   wherein said mandrel has a continuous undersurface extending substantially parallel to and spaced from the path of travel of the blown film from said die, said undersurface contoured to guide a stream of cooling air along its surface between said undersurface and said blown film as said blown film emerges from said die.

2. An apparatus as claimed in claim 1 wherein said apparatus is mounted on a central air exhaust stack.

3. An apparatus as claimed in claim 1 wherein said undersurface is adapted to direct said stream of cooling air radially outwardly and in the direction of travel of said blown film.

4. An apparatus as claimed in claim 1 wherein said apparatus is made of cast aluminum.

5. An apparatus as claimed in claim 1 wherein said axially moveable portion is affixed to an elevating device which is adapted to move said axially moveable portion away from or towards said first portion.

6. An apparatus as claimed in claim 1 wherein said mandrel is mounted on a rotatable sleeve bearing mounted on a central exhaust stack such that said mandrel will rotate about said central exhaust stack in concert with the rotation of said die.

7. An apparatus as claimed in claim 6 wherein said mandrel is connected to one or more spokes and said one or more spokes are connected to a connector mounted in said die such that when said die rotates, said mandrel rotates in concert therewith.

8. An apparatus as claimed in claim 1 for making a blown film having a long stock, wherein said mandrel is mounted at a substantial distance from said die.

9. An apparatus as claimed in claim 8 wherein said mandrel is mounted on an elevating device to elevate said mandrel to a substantial distance from said die.

10. An apparatus as claimed in claim 2 wherein a supply air annular flow channel surrounds said central air exhaust stack for channeling cooling air, to the interior of the forming bubble past said mandrel.

11. An apparatus as claimed in claim 10 wherein said supply air annual flow channel is a plurality of orifices to supply said cooling air to the interior of said forming bubble.

12. An apparatus as claimed in claim 10 wherein said supply air annual flow channel comprises a plurality of orifices extending through said mandrel and a diffuser mounted about said mandrel to diffuse said cooling air towards said forming bubble.

13. An apparatus as claimed in claim 12 further including a flow control valve for controlling the amount of cooling air passing through said control flow channels.

14. An apparatus as claimed in claim 13 wherein said flow control valve is an aluminum plate rotatably mounted on the top of said mandrel, said plate having a plurality of orifices therethrough.

15. An apparatus as claimed in claim 12 wherein said diffuser is a perforated steel screen having an open area of about 40%.

* * * * *